United States Patent [19]
Brock et al.

[11] 3,857,239
[45] Dec. 31, 1974

[54] SELECTABLE-IMPULSE SOLID PROPELLANT ROCKET MOTOR

[75] Inventors: Winford G. Brock, Athens; James C. Hodges, Jr., Huntsville, both of Ala.

[73] Assignee: The United States of America are represented by the Secretary of the Army, Washington, D.C.

[22] Filed: Aug. 8, 1966

[21] Appl. No.: 571,143

[52] U.S. Cl.................. 60/204, 60/250, 102/49.7, 102/49.8
[51] Int. Cl. ............................... B63h 11/00, F03h
[58] Field of Search.......... 60/234, 254, 256, 39–47, 60/219, 204, 250, 253, 220; 102/49.7

[56] References Cited
UNITED STATES PATENTS

| | | | |
|---|---|---|---|
| 2,945,344 | 7/1960 | Hutchinson............................ | 60/254 |
| 2,956,401 | 10/1960 | Kane..................................... | 60/250 |
| 3,066,486 | 12/1962 | Kirshner et al. ................... | 60/39.47 |
| 3,173,252 | 3/1965 | Ziegenhagen......................... | 60/234 |
| 3,248,875 | 5/1966 | Wolcott................................ | 60/254 |
| 3,293,855 | 12/1966 | Cuttill et al............................ | 60/229 |
| 3,340,691 | 9/1967 | Mangum............................... | 60/251 |
| 3,354,647 | 9/1967 | Aycock................................. | 60/254 |
| 3,677,101 | 7/1972 | Fink et al.............................. | 60/220 |

FOREIGN PATENTS OR APPLICATIONS

| | | | |
|---|---|---|---|
| 1,149,284 | 5/1963 | Germany........................... | 102/49.7 |

*Primary Examiner*—Samuel Feinberg
*Attorney, Agent, or Firm*—Edward J. Kelly; Herbert Berl; James T. Deaton

[57] ABSTRACT

A solid propellant rocket motor having its grain divided into a plurality of distinct, successive layers or zones of propellant, each layer or zone being separated by a thin layer of barrier material. A hot gas generator provided in the fore end of the rocket motor is employed to remove successive barrier layers as desired.

10 Claims, 3 Drawing Figures

PATENTED DEC 31 1974

3,857,239

Winford G. Brock
James C. Hodges Jr.
INVENTORS.

BY Harry M. Saragovitz
Edward J. Kelly
Herbert Berl
J. Keith Fowler

SELECTABLE-IMPULSE SOLID PROPELLANT ROCKET MOTOR

This invention relates to rocket motors and more particularly to an improved selectable-impulse, solid propellant rocket motor.

Solid propellant rocket motors possess distinct advantages over liquid propellant motors for tactical military applications. For example, solid propellant motors do not require the complicated and expensive valves, pumps, and conduits necessary for conveying fluid propellants from their storage tanks to the combustion chamber.

Solid propellants are stored and contained directly in the combustion chamber, and there is, therefore, no requirement for storage, transportation and handling of corrosive, toxic, and easily vaporized materials as is the case for liquid propellant motors.

These advantages, however, are to an extent offset by a major disadvantage of solid propellant motors. For example, in a conventional solid propellant grain, the oxidizer and fuel components are intermingled throughout the grain, and once the grain is ignited, combustion continues until the entire grain is consumed. While the total impulse of liquid propellant motors can be varied by merely controlling liquid supply valves, variable speed pumps, and the like, in response to a command signal, varying the total impulse of solid propellant grains is much more difficult. Extinguishment of the flame before the entire grain is burned out is not practical, and thrust termination devices such as head-end reversal ports have not proven to be satisfactory.

Variable or selectable-impulse capability has been provided in solid propellant rocket motors by employing a segmented propellant grain defining distinct zones of propellant separated by a layer of barrier material. The propellant is burned one zone at a time, combustion being halted by the barrier when that zone is consumed. The barrier, which contains insufficient oxidizer to support its own combustion, must be removed, for example, by spraying with a liquid oxidizer before the succeeding zone of propellant is ignited. The effective total impulse of the motor is varied by burning only the number of zones needed for a particular trajectory.

A major obstacle to attainment of a practical selectable-impulse motor has been the difficulty of removing the barrier between zones of propellant. Where more than one zone is to be burned, the barrier must be amenable to rapid removal so as to allow transition from one zone to the next without major variations in chamber pressure. In previous selectable-impulse motors, the barrier has been removed by spraying with a liquid oxidizer or by detonation of pyrotechnic material imbedded in or below the barrier material. The barrier-removal techniques requiring a liquid oxidizer present the same disadvantage as liquid propellant motors in the necessary storage and handling of corrosive liquids and the equipment associated therewith. In addition, the chemical reaction of the liquid oxidizer with the barrier has a finite rate of removal of about 0.030 in./sec. causing the chamber pressure to drop to a very low level before the succeeding zone can be ignited. The use of pyrotechnic material imbedded in or below the barrier is disadvantageous because of the required relative thickness of the barrier, e.g., up to 0.75 in., but normally in the range from 0.1 to 9.25 in., i.e., 100 to 250 mils. in order to prevent ignition of the pyrotechnic. This means that the debris of the barrier upon ignition may cause severe motor abnormalties.

Another problem in connection with selectable-impulse motors is timing and control of the barrier-removal mechanism so as to provide a smooth, quasi-continuous transition during burnout of the preceding zone, barrier-removal and ignition of the succeeding zone. In previous motors of this type, actuation of the barrier-removing liquid chemical or liquid oxidizer spray, or detonation of pyrotechnic material has been controlled, for example, by signals received from an accelerometer which senses the decreased acceleration occurring upon burnout of the preceding zone. This method requires expensive, high-precision equipment, and the chamber pressure necessarily drops to a very low level before ignition of the succeeding zone. Accordingly, a more effective and less expensive mechanism for controlling barrier-removal and ignition is desired.

According to the present invention, the solid propellant rocket grain is divided into a plurality of distinct zones of propellant. In one embodiment, the grains are cast in concentric layers with each layer of propellant being completely separated by a thin barrier or inhibiter film made of a material not capable of sustaining its own combustion. The innermost layer of propellant is ignited and burns through completely; however, the barrier separating the layer does not burn. Therefore, the remaining layers of propellant do not ignite and the rocket engine ceases to function. If, however, the intended range of the rocket requires additional impulse, a "rocket-type" igniter or gas generator unit, located contiguous the fore end of the combustion chamber, is operated thereby removing the barrier separating the first (innermost) and second concentric layers and igniting the second layer of propellant. This process of operation is repeated until a sufficient number of propellant layers has been burned to provide the impulse necessary to propel the payload of the rocket the desired distance. Another embodiment of the invention employs successive zones and separating barriers in a tandem arrangement and operates in the same manner as the concentric layers or zones. Accordingly, the present invention makes it possible to design solid propellant rocket engines which can be used to propel a payload varying distances by regulating the amount of solid propellant grain that is consumed. Moreover, by combining the regulation of the amount of propellant burned with variation in the launch angle, the instant invention permits the use of only one type of solid propellant rocket motor to provide a wide range of performance capabilities with regard to effective range and trajectory. Such a motor combines the simplicity and reliability of the solid propellant motors with the variable range and trajectory capabilities of the liquid propellant motors. In addition, a motor of the type contemplated by the invention offers tremendous economic advantages since the many types of solid propellant motors now required to give complete range capabilities over a wide latitude of operating distances could be replaced with a fewer number of motors of a type offering a wider distribution of range and trajectory capabilities.

It is, therefore, a primary object of the present invention to provide an improved selectable-impulse, solid propellant rocket motor.

Another object of this invention is to provide a segmented solid propellant grain having easily removed barriers between segments.

Still another object of the invention is to provide, in a selectable-impulse solid propellant grain of plural zones, a mechanism which will effect rapid and effective removal of the barrier between propellant zones, which will maintain pressure during transistion, and which will ignite the adjacent zone.

Yet another object of the invention is to provide a mechanism which will yield effective timing and control of barrier-removal in solid propellant grains of a selectable-impulse motor.

A further object of the invention is to provide a method of operating a selectable-impulse solid propellant motor wherein there will be a smooth transistion between burning successive zones of propellant, and wherein this transition will be accomplished with a minimum variation in chamber pressure.

An important feature of the present invention resides in the use of a "rocket-type" gas generator to remove the barrier or inhibitor film between layers.

Other objects and advantages of this invention will be apparent from the following detailed description and the drawings, wherein.

Figure 1:
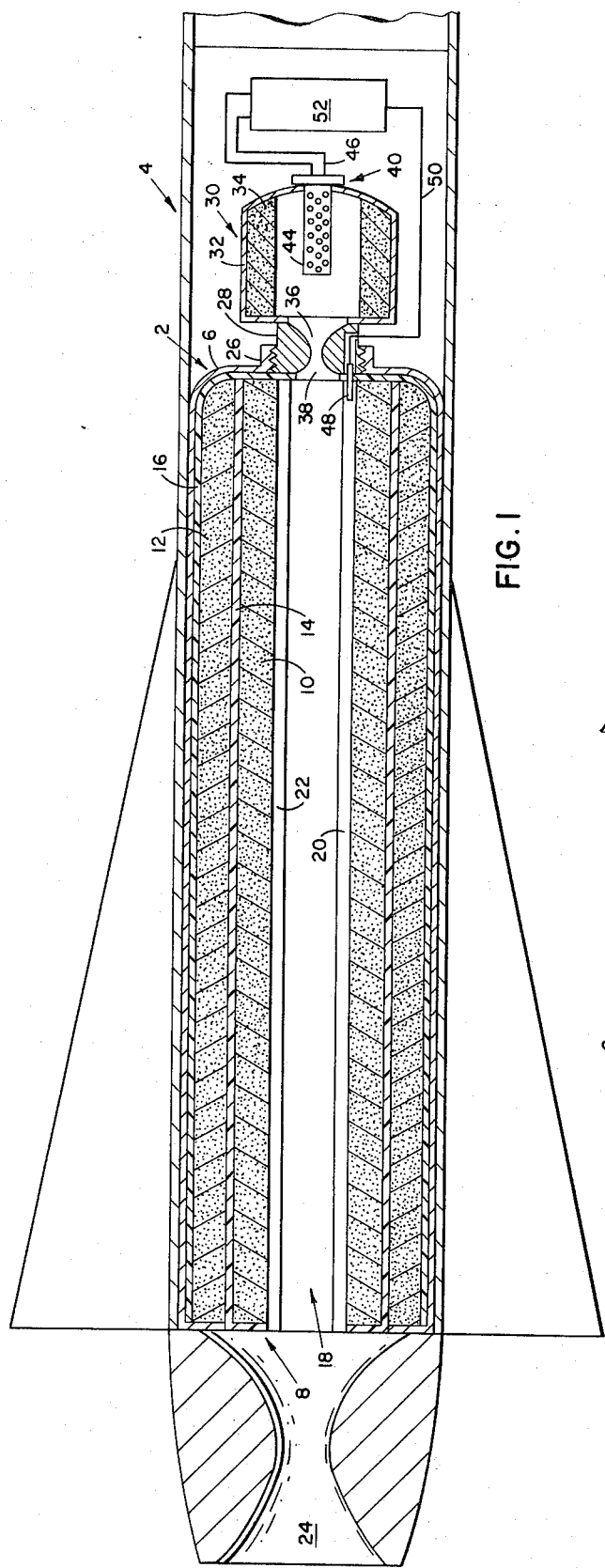
FIG. 1 is a longitudinal sectional view, partly broken away, of one form of a selectable-impulse rocket motor embodying the invention in normal pre-operative condition.

In the present invention, a solid propellant rocket motor is provided with a plurality of zones of propellant separated by a thin layer of barrier material. A hot gas generator of the rocket type is disposed in the fore end of the motor so that the gases produced therein come in contact with the barrier after the first zone of propellant is consumed. The gas generator gases remove the barrier very rapidly. Ignition of the propellant zone adjacent the barrier is effected by the hot gases practically instantaneously with removal of the barrier. Timing the firing of the gas generator in a continuous operation is controlled in a manner such that motor chamber pressure is maintained relatively constant during the transition between zones of propellant.

The segmented propellant grain of the present invention is designed to fit in a conventional motor case, normally an elongated metal cylinder with a converging-diverging nozzle at the left aft end, and the gas generator is positioned at the fore end so that the gases can come in contact with the barrier between zones.

Although this invention is not so limited, in the preferred grain structure, the zones of propellant comprise concentric layers, with the first or innermost layer being penetrated through its entire length by an axial perforation. For most applications, two concentric layers are sufficient, but additional layers may be provided, with an additional firing device being provided in the gas generator for each successive layer. The burning surface defined by the perforation can be varied in shape in the same manner as for non-segmented grains, for example, a four-pointed star perforation, a five-pointed star perforation, a wagon wheel perforation, and the like.

Another grain structure within the scope of this invention comprises two or more axially perforated cylindrical segments stacked in end-to-end relationship, each segment being of a continuous, nonlayered shape and of an exterior diameter such as to occupy the full diameter of the motor case. This latter type grain structure will be referred to as the tandem-grain. With the tandem-grain structure, the segment at the aft end is burned first as by a conventional igniter (now shown) in the conventional manner, and succeeding forward segments are then burned by removing the barrier and igniting the next segment by means of the gas generator. In the tandem-grain arrangement, each of the segments, except the rearwardmost segment, is provided with a barrier layer.

The solid propellant in this invention is not limited to a particular composition, and any of the compositions previously used for conventional grains may be employed. These compositions, normally comprising a cured intimate mixture of a polymeric binder, polyurethanes, polydienes, polysulfides and the like, can be used, or the composition can be based on plasticized nitrocellulose. If fuel, in addition to that provided by the binder itself, is desired, finely divided metals, such as aluminum, boron or beryllium, can be provided in the mixture. The oxidizer can be an inorganic nitrate, chlorate or perchlorate, and preferably ammonium perchlorate, or a suitable organic oxidizer. The solid propellant zones can be prepared by conventional methods such as by casting or extruding in the uncured state, followed by curing.

The barrier between zones of propellant can be any suitable material which does not support its own combustion and which, when disposed as a thin layer between propellant zones, does not burn through upon exposure to the heat and erosion produced by burning of the adjacent propellant layer. Various organic polymers, including polybutadienes, polyurethanes, polysulfides, plasticized nitrocellulose, and any other elastomeric or polymer type materials that can be applied and bonded to the selected propellant are suitable. These polymers, which may be filled with carbon black, asbestos, titanium dioxide and the like, can be applied to the propellant grain by spraying, dipping, or brushing while they are in the uncured state and cured in place to form a continuous layer.

The barrier layer between propellant zones must be thin to allow rapid removal by hot gas-generator gases. With the present invention, a thickness of about 6 mils. to 80 mils. can be used, and about 10 mils. thickness is preferred. It was formerly believed necessary to employ a much thicker layer, for example, 100–250 mils., in order to ensure that the barrier would not burn through prematurely and thus cause ignition of the succeeding zone in an uncontrolled manner. We have found, however, that a thinner layer, such as can be removed rapidly with gas-generator gases, serves adequately as a barrier. The thickness of the layer can be adjusted within the above-defined 6–80 mils. limits, depending on the particular propellant characteristics and manufacturing tolerances, a thicker layer being preferred for more energetic, hotterburning propellants.

A solid propellant, rocket-type gas generator unit is provided in the motor for rapid removal of the barrier with hot gases produced by said generator unit. The gas generator unit, which is in effect a small rocket motor having a solid propellant grain, case, and nozzle, must burn at a high temperature, e.g., in the range of 5,000°F and at a relatively high rate in order to be effective. Gas generators such as have been used for igniting large solid propellant grains, and referred to in the art as "pyrogen" type gas generators, may be used for this purpose. Lower temperature, slow-burning gas generators such as are normally used to supply energy for auxiliary equipment on large rockets have been found not effective for barrier-removal. The size and design of the gas generator is selected to correspond to the design of the selectable-impulse motor. In order to minimize variations in motor chamber pressure during the transition between propellant zones, the gas generator should produce a peak mass discharge which corresponds to the mass discharge produced by the burning propellant zones. The barrier can then be effectively removed without undue stress to the motor case. According to another aspect of the invention, a multiple-orifice type nozzle or deflection plate is utilized in the aft end of the gas generator unit. The latter plate is formed with a plurality of canted nozzle orifices and may be of the type disclosed in U.S. Pat. No. 2,661,692.

Referring in more detail to the drawings, in FIG. 1, there is shown a rocket motor 2 disposed in the aft end of a missile 4. A layered solid propellant grain 8 is disposed longitudinally within the cylindrical case wall 6 of the motor. Propellant grain 8 is comprised of concentric propellant layers 10 and 12 completely separated from one another by a thin barrier layer 14. Conventionally, an insulating liner 16 is disposed between outermost layer 12 and case wall 4 to provide thermal protection to the latter. Propellant grain 8 is penetrated axially over its entire length by a perforation 18 defined by the inner surface of innermost propellant layer 10. Conventionally, for example, propellant layer 10 may be formed with star-point projections 20 and 22 to afford a greater initial and more uniformly burning surface. As stated above, the burning surface of the grain may take various shapes. A conventional nozzle 24 is attached to the aft end of case wall 4. The head end of case wall 4 is provided with an annular protruding flange 26 having internal threads to receive externally threaded, cylindrical protrusion 28 of gas generator 30. Gas generator unit 30 comprises a generally cylindrical case wall 32 having a hot-gas producing, solid propellant charge 34 disposed therein. A rocket nozzle 36 is secured to the aft end of case wall 32 so that nozzle opening 38 is aligned with axial perforation 18 in propellant layer 10. An igniter 40 is disposed coaxially within the forward end of propellant charge 34, the igniter having pyrotechnic material contained in a cylindrical container 44. Electrical heating wire 46 is in turn imbedded in the pyrotechnic material. A pressure sensor element 48 is disposed within the motor cavity to monitor chamber pressure. Sensor 48 is connected by electrical conductor 50 for transmitting a pressure signal to control device 52. Control device 52 contains means (not shown) for integrating the pressure values received from sensor 48 by transmitting means 50 and actuates heating wire 46 when a predetermined quantity of the pressure integral is attained. While only two concentric layers are illustrated in FIG. 1, it is to be understood that more layers may be provided within the scope of this invention. However, when more layers are used, it should be apparent that a gas generator unit, such as a wafer type unit, which is capable of multiple firings, is required to remove the plural barriers.

In operation of the device according to FIG. 1, innermost propellant layer 10 is ignited as by conventional igniter means (not shown) normally disposed in the aft end of the rocket motor chamber. After this layer is consumed, gas generator unit 30 is actuated thereby forcing hot, highpressure gases through gas generator nozzle passage 38 into contact with barrier 14 between layers. The barrier is thus removed rapidly by the hot, high-pressure gases and, substantially simultaneously therewith, the second or outermost propellant layer 12 is ignited. As stated previously, if more than two layers are provided, a separate firing means must be provided by the gas generator unit to thereby remove each successive barrier and ignite each successive propellant layer. Therefore, it is seen that an apparatus, and a method of operating the same, is provided which affords control over the total impulse of a given rocket engine. Depending on the mission, it is apparent that operation of the rocket motor of FIG. 1 may be terminated after the first layer is consumed, or a pseudo-continuous operation may be effected. In the former mode of operation, for example, in a boost-coast-sustain mode, the first layer is consumed and a time interval may be set before firing the second or next successive layer. In the pseudo-continuous mode of operation, a time of 0.2 second or less may be consumed in removing the barrier and igniting the second layer. In the latter mode of operation, since the gas generator unit is capable of yielding substantially the same mass discharge as the propellant in the combustion chamber, the gas generator unit not only removes the barrier practically instantaneously but also fills the pressure gap. Thus, the process of burning propellant layers, removing adjacent barriers, and igniting successive layers is repeated until as many layers of propellant as required have been burned to provide the necessary total impulse for a specific mission.

Figure 2:
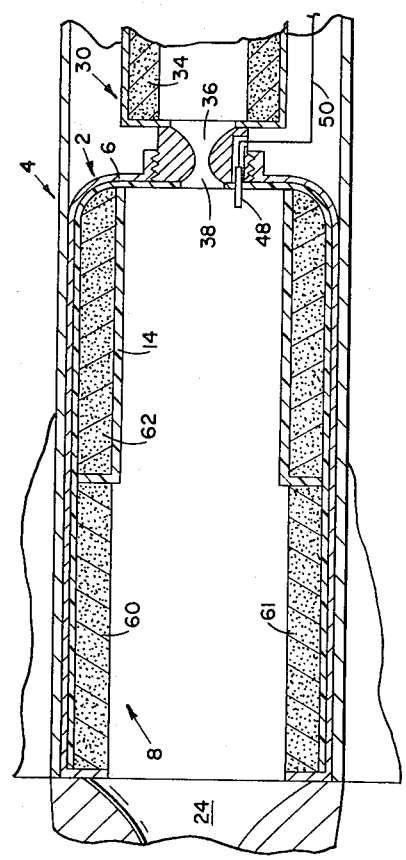
FIG. 2 is a longitudinal sectional view, similar to FIG. 1 and with parts broken away, illustrating another embodiment contemplated by the invention.

Another embodiment of the invention is depicted in FIG. 2. In this embodiment, the plurality of propellant zones are defined by annular grain sections or segments defining a tandem arrangement. Thus, the rearwardmost segment 60 is separated by barrier 14 from a forwardmost segment 62. The operation of this embodiment is similar to that of FIG. 1 in that the first zone or segment 60 is ignited along its axial perforation 61 as by conventional means (not shown). After segment 60 is consumed, gas generator unit 30 is fired, thereby removing the barrier and igniting the second zone or segment 62 as desired. Hence, it is seen that this embodiment thereby affords effective control over the total impulse produced by a given motor.

Figure 3:
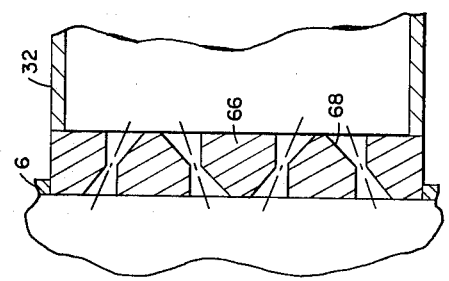
FIG. 3 is a partial longitudinal sectional view of a multiple-orifice type nozzle plate interconnecting the gas generator and the rocket motor case.

Another aspect of the invention (FIG. 3) includes the use of a multiple-orifice type nozzle or deflector plate 66 rigidly positioned between the gas generator and the axial opening in the forward end of the rocket motor. This plate is formed with a plurality of canted nozzle-like passages 68. Such a nozzle plate may be used in either embodiment of the invention in lieu of rocket nozzle 36. This combinative structure provides for a swirling distribution of hot gases, thus enhancing the heat transfer of the gases to the barrier and/or the propellant surface. The centrifugal forces set up by imparting a "swirling action" to the gases causes the heavier particles to impinge the surface to be removed, or ignited, in a more efficient manner. Additionally, the reduction in laminar flow along the surface to be removed, or ignited, affords greater heat transfer. Also, the "stay" time of the gases will be increased, thereby making greater use of the available heat. It is seen that the use of this nozzle eliminates the need for baffles, thereby reducing weight requirements. Obviously, the size of the passages and the angle at which the same are canted will be dependent on the geometry of the motor cavity and the results desired.

There is no difference in the method of operation of the two forms of the disclosed selectable-impulse motor, the only difference being structural, as previously described. In addition, the use of the single type nozzle or the multiple-orifice plate type nozzle only effects the efficiency of the apparatus and does not change the method of operation.

It is believed that the operation of the selectable-impulse motors according to the present invention and their manner of construction will be clear to those skilled in the art, and it is to be understood that variations in the manner of operation and construction of the invention may be adhered to provided such alterations fall within the spirit of the invention and the scope of the appended claims.

What is claimed is:

1. A selectable-impulse solid propellant rocket motor comprising, in combination: a motor case having a substantially cylindrical external wall which forms a chamber, said wall being formed on its aft end with a converging-diverging nozzle, said wall also closing the forward end of the chamber except for a coaxial opening in communication with said chamber whereby hot gas can be introduced into said chamber; a solid rocket propellant grain disposed in said chamber, said grain including a plurality of adjacent zones of propellant, the center of the grain having an axial perforation extending from end to end therethrough along the center axis thereof; a thin inhibitive barrier completely separating said adjacent propellant zones and formed of a material incapable of supporting its own combustion; and a rocket-type gas generator unit having exhaust nozzle means on its aft end, said means being secured to said motor case about said coaxial case opening, whereby hot gases produced by said unit may be directed through said opening and said axial perforation for removing each said inhibitive barrier between adjacent propellant zones.

2. A rocket motor according to claim 1 wherein an insulative liner is on the internal wall of said motor case, said propellant zones are defined by concentric layers, the innermost concentric layer being formed with said axial perforation and the outermost concentric layer being contiguous said insulative liner, and wherein the barrier material completely separates said concentric layers.

3. A rocket motor according to claim 1 wherein said propellant zones are defined by elongated cylindrical segments of solid propellant disposed coaxially within said chamber in tandem relationship, and wherein said barrier separates the forwardmost from each of the next succeeding adjacent segments and also covers the axial perforation of said forwardmost segments with only the axial perforation of the rearwardmost segment being exposed and free from a barrier.

4. A rocket motor according to claim 1 wherein said barrier is a layer of about 10 mils. in thickness.

5. A rocket motor according to claim 1 wherein said gas generator exhaust nozzle means is a converging-diverging rocket nozzle.

6. A rocket motor according to claim 1 wherein said gas generator exhaust nozzle means is a deflector plate having a plurality of canted nozzles formed therein.

7. A rocket motor according to claim 1 wherein said rocket-type gas generator unit has a solid propellant grain of similar composition to that of said rocket motor grain disposed therein, said gas generator unit including an igniter disposed in the forward end thereof for igniting said propellant grain in the generator unit; a control means located outside said generator unit and connected to said igniter; and sensor means disposed within said rocket motor chamber having electrical conductor means interconnecting said sensor and said control means thereby controlling the firing of said gas generator to remove the barrier between adjacent propellant zones.

8. A rocket motor according to claim 7 wherein said sensor means includes a pressure responsive element disposed within the motor cavity and said control means controls ignition of the gas generator at a predetermined quantity of the pressure-time integral based on the burning time and the chamber pressure values at termination of burning of successive zones relayed to said control means from said chamber and said sensor means by said electrical conductor means.

9. The method of operating a solid propellant rocket motor as defined in claim 2 to selectively vary the total impulse achieved, the steps of the method comprising: igniting and burning the innermost layer of propellant, thereby exposing the adjacent barrier; actuating said gas generator unit thereby introducing hot, high pressure gases through the opening in the forward end of said rocket motor chamber whereby said gases remove said barrier and ignite the adjacent layer of propellant; and repeating the above steps until the desired number of propellant layers have been consumed.

10. The method of operating a solid propellant rocket motor as defined in claim 3, the steps of the method comprising: igniting and burning the rearwardmost segment of propellant thereby subjecting the barrier around the next succeeding segment to gases from the gas generator unit; actuating said gas generator unit thereby introducing hot, high pressure gases through the opening in the forward end of said rocket motor chamber whereby said gases remove said barrier and ignite the next adjacent segment of propellant; and repeating the above steps until the desired number of propellant segments have been consumed.

* * * * *